US012716554B2

(12) United States Patent
Baer

(10) Patent No.: US 12,716,554 B2
(45) Date of Patent: Aug. 25, 2026

(54) MOUNTING SYSTEM FOR PRESSURE VESSELS

(71) Applicant: Worthington Cylinders GmbH, Kienberg bei Gaming (AT)

(72) Inventor: Oliver Baer, Unna (DE)

(73) Assignee: Hexagon Technology AS, Alesund (NO)

( * ) Notice: Subject to any disclaimer, the term of this patent is extended or adjusted under 35 U.S.C. 154(b) by 0 days.

(21) Appl. No.: 18/555,302

(22) PCT Filed: Mar. 30, 2022

(86) PCT No.: PCT/EP2022/058511

§ 371 (c)(1),
(2) Date: Oct. 13, 2023

(87) PCT Pub. No.: WO2022/218711

PCT Pub. Date: Oct. 20, 2022

(65) Prior Publication Data

US 2024/0191843 A1 Jun. 13, 2024

(30) Foreign Application Priority Data

Apr. 16, 2021 (DE) ........................ 102021109703.7

(51) Int. Cl.
*F17C 13/08* (2006.01)

(52) U.S. Cl.
CPC ...... *F17C 13/084* (2013.01); *F17C 2203/018* (2013.01); *F17C 2205/0107* (2013.01);
(Continued)

(58) Field of Classification Search
CPC ..................................................... F17C 13/084
See application file for complete search history.

(56) References Cited

U.S. PATENT DOCUMENTS

| | | | |
|---|---|---|---|
| 2,761,397 | A | 9/1956 | Holst |
| 3,479,043 | A | 11/1969 | Piehl |

(Continued)

FOREIGN PATENT DOCUMENTS

| | | | |
|---|---|---|---|
| CA | 2 384 915 | C | 2/2007 |
| CN | 112313419 | A | 2/2021 |

(Continued)

OTHER PUBLICATIONS

International Preliminary Report on Patentability for PCT/EP2022/058511, Dated Oct. 26, 2023, English Translation.

(Continued)

*Primary Examiner* — Reinaldo Sanchez-Medina
*Assistant Examiner* — Nicole Gardner
(74) *Attorney, Agent, or Firm* — Westman, Champlin & Koehler, P.A.

(57) ABSTRACT

The invention relates to a mounting system for pressure vessels, having a first supporting member on which at least one first mount (6) for a first end of the pressure vessel is arranged, and having a second supporting member on which at least one second mount for a second end of the pressure vessel is arranged, the first mount (6) having an inner ring (11) in which the first end of the pressure vessel (1) is accommodated in a rotationally fixed manner.
The object of the invention is to optimize the mounting for the end bosses of the pressure vessels.
This task is solved in that the inner ring (11) is pivotally mounted about a first pivot axis in an outer ring (12), which in turn is fastened pivotally in the mount (6) about a second pivot axis extending at right angles to the first pivot axis.

16 Claims, 6 Drawing Sheets

(52) U.S. Cl.
CPC ................. *F17C 2205/0142* (2013.01); *F17C 2205/0153* (2013.01)

(56) References Cited

U.S. PATENT DOCUMENTS

| | | | | |
|---|---|---|---|---|
| 4,545,570 | A * | 10/1985 | KaDell, Jr. | G01L 7/041 269/902 |
| 5,515,997 | A | 5/1996 | Kirk et al. | |
| 6,230,922 | B1 | 5/2001 | Rasche et al. | |
| 6,986,490 | B2 | 1/2006 | Eihusen et al. | |
| 6,986,494 | B2 | 1/2006 | Strasser | |
| 2004/0056164 | A1 | 3/2004 | Eihusen et al. | |
| 2004/0181977 | A1 | 9/2004 | Yamamoto et al. | |
| 2008/0177386 | A1 | 7/2008 | Cerundolo | |
| 2009/0133948 | A1 | 5/2009 | Ijaz et al. | |
| 2011/0138923 | A1 | 6/2011 | Oelerich et al. | |
| 2012/0174371 | A1 | 7/2012 | Koehnen et al. | |
| 2017/0282709 | A1 | 10/2017 | Sasaki et al. | |
| 2017/0299769 | A1 | 10/2017 | Ohmi et al. | |
| 2017/0370527 | A1 | 12/2017 | Moutray et al. | |
| 2019/0135160 | A1 | 5/2019 | Reineck | |

FOREIGN PATENT DOCUMENTS

| | | | |
|---|---|---|---|
| DE | 201 12 779 | U1 | 11/2001 |
| DE | 10 2012 000 035 | A1 | 7/2012 |
| DE | 10 2012 011 612 | A1 | 1/2013 |
| DE | 10 2013 103 710 | A1 | 10/2014 |
| DE | 10 2014 203 351 | A1 | 8/2015 |
| EP | 1 736 344 | A1 | 12/2006 |
| EP | 1 925 873 | A1 | 5/2008 |
| EP | 3 078 529 | A2 | 10/2016 |
| GB | 2 451 793 | A | 2/2009 |
| JP | S55-175038 | U | 12/1980 |
| JP | 2016-044789 | A | 4/2016 |
| KR | 10-2017-0113345 | A | 10/2017 |
| WO | WO 99/27293 | A2 | 6/1999 |
| WO | WO 2015/074799 | A1 | 5/2015 |

OTHER PUBLICATIONS

International Search Report and Written Opinion, Dated Jul. 22, 2022, English Translation.
Germany Office Action, Dated Sep. 16, 2021.
Office Action in corresponding Japanese Application No. 2023-562784, mailed Mar. 10, 2026.

* cited by examiner

MOUNTING SYSTEM FOR PRESSURE VESSELS

CROSS-REFERENCE TO RELATED APPLICATIONS

This Application is a section 371 National Stage entry from International Application PCT/EP2022/058511, filed Mar. 30, 2022, and published at WO 2022/218711A1 on Oct. 20, 2022. The content of the priority application is hereby incorporated by reference in its entirety.

TECHNICAL FIELD

The system described herein relates to a mounting system for pressure vessels.

BACKGROUND

Pressure vessels for containing gas such as hydrogen or liquefied gas are often designed as composite pressure vessels with a liner made of plastic or metal, e.g., aluminum, and two neck pieces made of metal arranged in the neck area, as well as with a winding of a fiber composite material reinforcing the liner. Such pressure vessels are known, for example, from WO 99/27293 A2. The neck pieces are also referred to as end bosses and are used to attach a filling and extraction valve. Such valves may be provided at both ends of the pressure vessel. Alternatively, one end of the pressure vessel may be closed. The end bosses are also used to attach the pressure vessels to mounting systems that can be used to attach multiple pressure vessels to a vehicle, for example.

A mounting system is known, for example, from publication CA 2 384 915 C. Mounting blocks are provided at both ends to clamp the end boss firmly in place. One problem with such mounting systems is the risk that forces acting on the mounting system are introduced into the pressure vessels. This affects the strength of the pressure vessels and can also pose a safety risk due to the filling of the pressure vessels with flammable media. In CA 2 384 915 C, the bearings have a certain bendability in the longitudinal direction of the pressure vessels, which avoids the introduction of excessive forces into the pressure vessels. The publications US 2004/9056164 A1 and US 2017/0370527 A1 describe mounting systems for pressure vessels in which the end bosses are connected to the mounting members of the mounting system via balls. This prevents torsional and bending forces from being introduced into the end bosses. Mounting systems for pressure vessels are taught in the publications US 2017/0 370 527 A1 and U.S. Pat. No. 6,986,490 B2.

SUMMARY OF THE INVENTION

It is desirable to optimize the mounting for the end bosses of the pressure vessels.

According to the system described herein, an inner ring is fastened pivotably about a first pivot axis in an outer ring, which in turn is fastened pivotably in the mount about a second pivot axis extending at right angles to the first pivot axis.

In other words, it is proposed to provide a gimbal suspension for at least one end boss of the pressure vessel. The end boss itself is held in a rotationally fixed manner in this gimbal suspension. This avoids damage to attachments fastened to the end boss, in particular lines for the filling and extraction of pressurized gas by means of a valve. At the same time, the design of this attachment is easy to implement, has the required strength and is easy to assemble and disassemble.

In practice, the inner ring can consist of two inner ring halves that are divided along a diametrically extending first parting plane. This has the advantage that the inner ring halves can be easily mounted around the end boss. In this case, the inner ring can be rotatably attached to the outer ring via two first pivots. A pivot hole can be arranged in each inner ring half, into which one of the pivots projects. The inner ring may have an inwardly open annular groove into which a collar can be inserted, the collar being located at the first end of the pressure vessel, in particular at the end boss. The two halves of the inner ring can be easily slid over the collar until end faces of the two halves abut in a first parting plane. The inner ring may further include at least one retaining element that positively cooperates with a complementary retaining element at a first end of the pressure vessel. The retaining element and the complementary retaining element may be configured to engage when the inner ring halves are pushed together. The retaining elements may be two diametrically opposed material projections which project inwardly from the bottom of the groove and are each located on one of the inner ring halves. The collar then has complementary areas deviating from the round crosssection, which interact positively with the material projections when the inner ring is assembled. The first pivots can project into pivot holes that are arranged diametrically opposite each other in the area of the material protrusions. In particular, if the material projections are formed as flattenings of the groove or as projections within the groove which are received in complementarily shaped receptacles or flattenings of the collar, the material thickness of the inner ring in the region of the material projections is maximum and the strength of the receptacle for the pivot is large.

In practice, the outer ring may consist of two outer ring halves divided along a diametrically extending second parting plane. Thus, the outer ring has a structure similar to the inner ring. In the area of a second parting plane, two diametrically opposed recesses can be arranged to accommodate the two first pivots. The first pivot projecting into the pivot holes of the inner ring can then be enclosed on both sides by the two recesses, each of which is located on one of the two outer ring halves. In this way, the inner ring is held in the outer ring so that it can pivot about the first pivots. Each outer ring half can have a pivot hole in the central area for receiving a second pivot. The second pivots are held on a mounting ring that is attached to a mounting block. The second pivots hold the outer ring so that the outer ring can pivot about a second pivot axis. The mounting block forms the mount for the end boss.

In this case, a second parting plane can run perpendicular to the first parting plane so that a second pivot axis runs perpendicular to the first pivot axis. In this way, the inner ring and outer ring can be easily mounted. In practice, the outer ring can be mounted in a mounting block consisting of two mounting halves divided along a diametrically extending third parting plane. The mounting block may have an annular receiving groove into which the mounting ring is inserted. The mounting ring is divided into two mounting ring halves along a fourth parting plane running at right angles to the third parting plane. The mounting ring can have two diametrically opposed receiving holes in an area of the fourth parting plane, each for receiving one of the second pivots. Again, this design achieves an easy mountability and dismountability of the bearing for the end boss. The mounting ring can be held in the annular receiving groove with a small amount of play. For this purpose, the two mounting halves can be screwed to the mounting system using mounting screws which protrude through holes aligned with each other in the region of the vertical edges of the mounting halves. The mounting screws fix the mounting ring in the locating groove of the mounting block and fix all rings to each other and the collar of the end boss in the inner ring. The mounting ring can be rotated in the locating groove so that a rotational position of the mounting ring can be aligned with the mounting position of the end boss with the valve attached to the end boss. The mounting ring can be locked in the rotational position using a grub screw, which is screwed against the mounting ring in a threaded hole in one half of the bearing.

In practice, the second end of the pressure vessel may be attached to the second mount movably in the longitudinal direction of the pressure vessel. For this purpose, the second mount may have a cylindrical bore surrounding a cylindrical portion of the second neck piece (end boss) of the pressure vessel. In this regard, the second mount may be formed substantially in accordance with the first mount, with axial displaceability being provided. For example, the mounting ring may be displaceable in the receiving groove of the mounting block. Or, the end boss may have a cylindrical portion axially slidably retained in the inner ring.

BRIEF DESCRIPTION OF DRAWINGS

Further practical embodiments and advantages of the system described herein are described below in connection with the drawings.

DETAILED DESCRIPTION OF VARIOUS EMBODIMENTS

Figure 1:
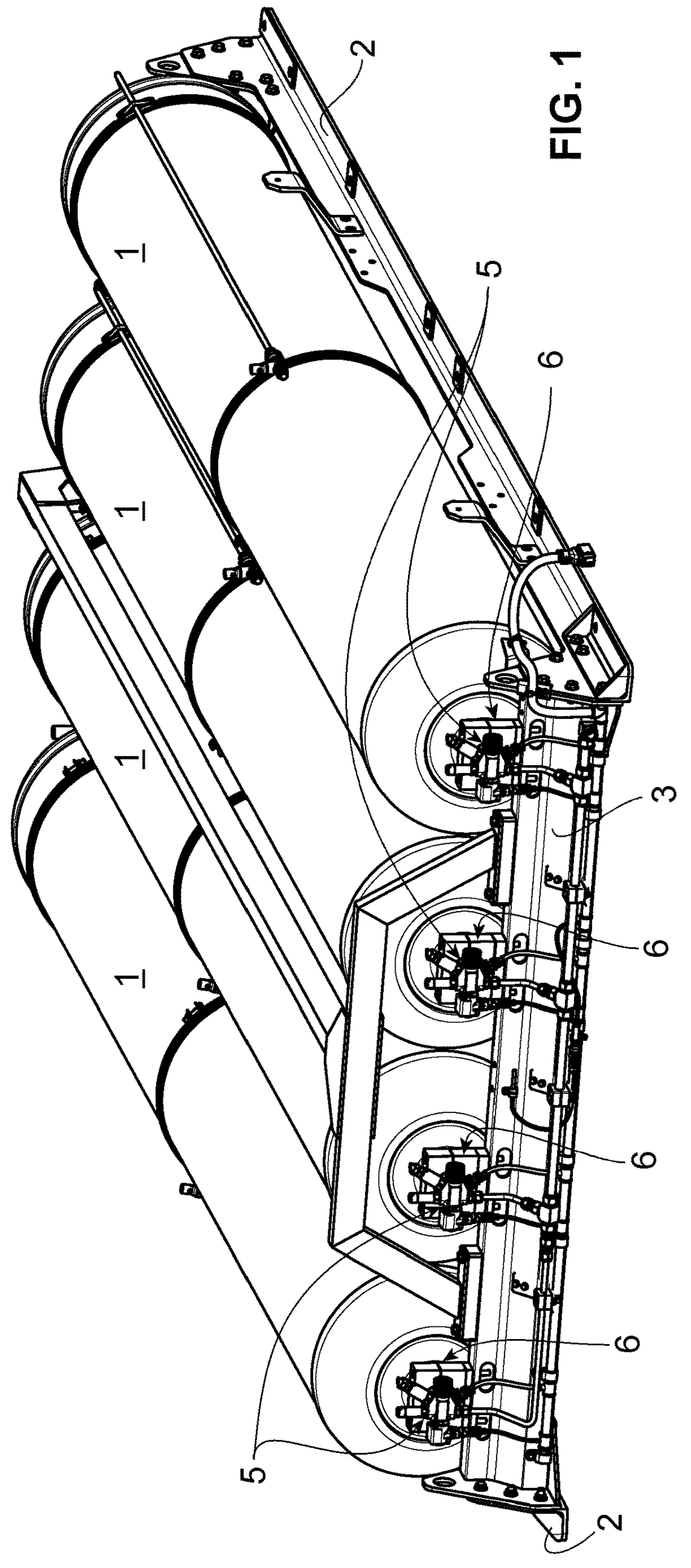
FIG. 1 shows a three-dimensional view of a rack viewed from the front, to which four pressure vessels are attached via four mounts.

FIG. 1 shows a rack for four pressure vessels 1, which is designed as a closed frame with two longitudinal profiles 2 and two transverse profiles 3. Only the front transverse profile 3 can be seen in FIG. 1. The rear transverse profile in the drawing plane can be of identical design, as described below in connection with FIG. 9. However, the rear transverse profile may also differ from the front transverse profile 3 because the rear end of the pressure vessels 1 may also differ from the front end visible in the drawing. Pressure vessels 1 are known which have identical front and rear end bosses 4 (cf. FIGS. 5 to 8). However, pressure vessels 1 are also known which have deviating end bosses at the rear end, for example closed end bosses.

The pressure vessels 1 can be used in particular to hold gaseous fuel for vehicles, for example liquid gas or hydrogen. The end bosses 4 of the pressure vessels 1, which can be seen in FIGS. 5 to 8, have through-holes through which the pressure vessels 1 can be filled with fuel and emptied again. Extraction valves 5, which can be seen in FIG. 1, are arranged on the end bosses 4 of the pressure vessels and control the flow of gas during refueling and emptying of the pressure vessels 1.

Four mounts 6 can be seen on the front transverse profile 3 in FIG. 1, which are described in more detail in connection with the following figures. The valves 5 and the mounts 6 cover the end bosses 4 in FIG. 1. The mounts 6 fix the end bosses 4 of the pressure vessels 1 visible in FIGS. 5 and 6, while at the same time provide a certain degree of mobility. In particular, the pressure vessels 1 are not to absorb forces or moments acting on the rack. The forces and moments are to be largely absorbed by the profiles 2, 3 of the frame of the rack. However, changes of shape of the frame but also changes of shape of the pressure vessels 1 depending on temperature and internal pressure require that the end bosses 4 of the pressure vessels 1 are held movable. On the other hand, it is desirable to hold the end bosses 4 in the mount 6 so that the end bosses 4 cannot rotate. Rotation of the end bosses 4 could damage the extraction valves 5 attached to the end bosses 4 or lead to leaks.

Figure 2:
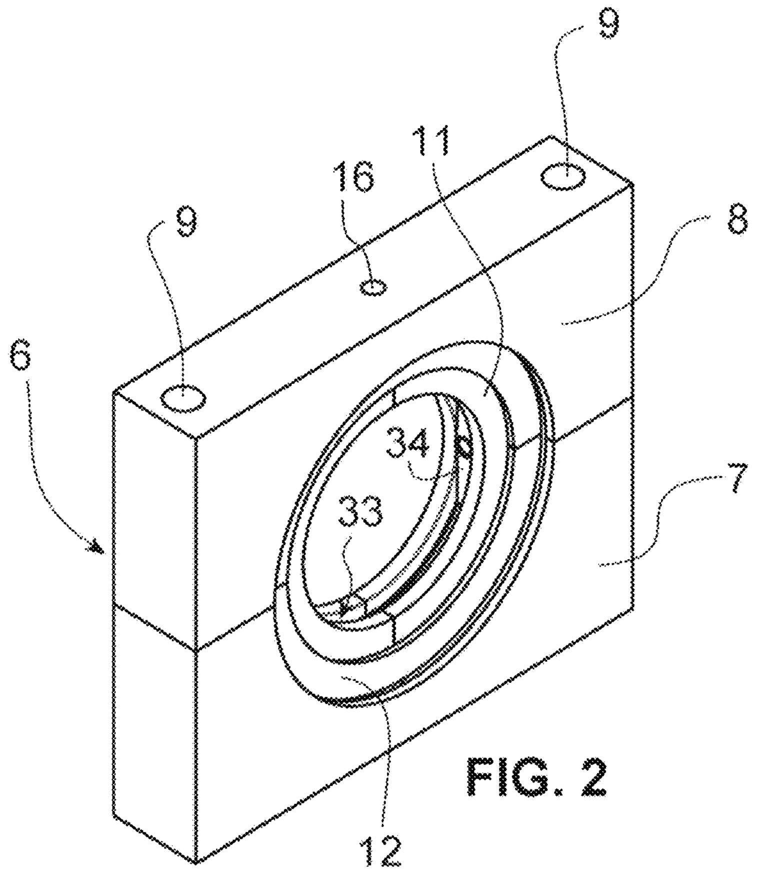
FIG. 2 shows a three-dimensional view of a mount of the rack of FIG. 1.
Figure 3:
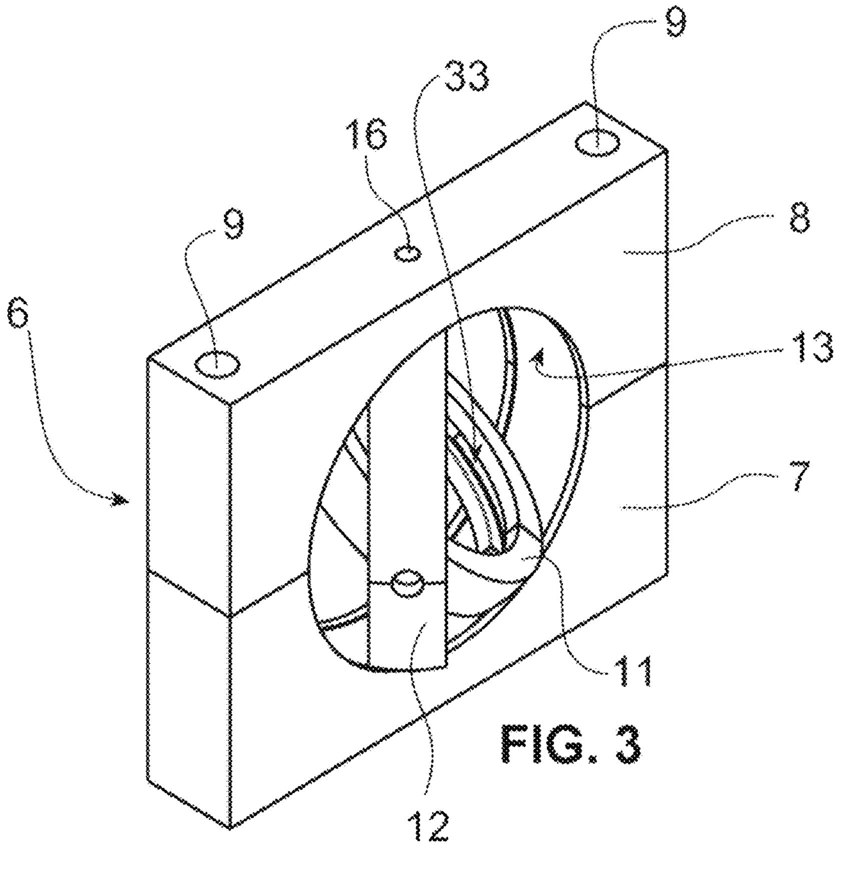
FIG. 3 shows a view of the mount corresponding to FIG. 2 with a displaced receiving element for the end boss of the pressure vessel.
Figure 4:
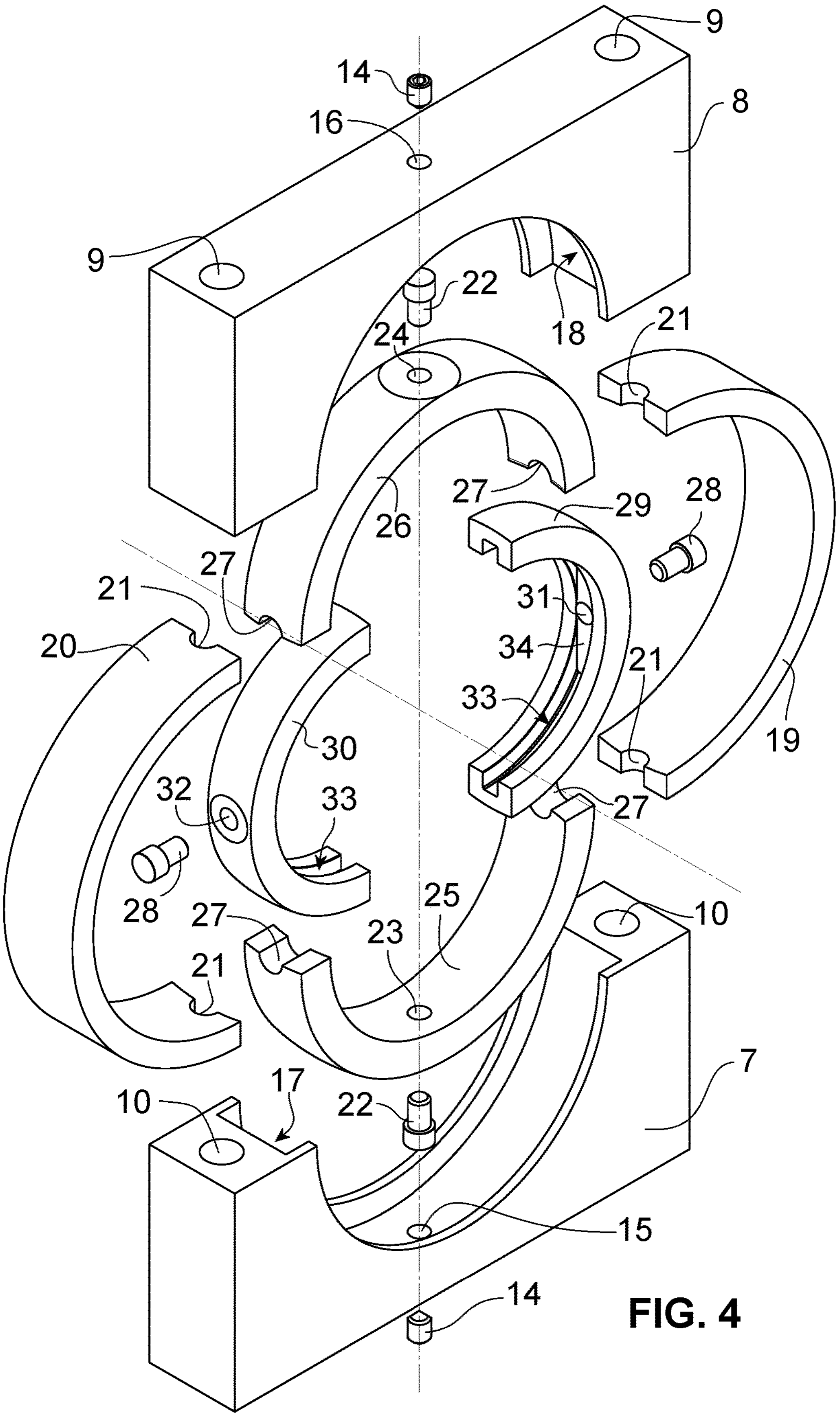
FIG. 4 shows a three-dimensional exploded view of the mount of FIGS. 2 and 3.

FIGS. 2-4 show details of the mounts 6 for the end bosses 4. It can be seen that each mount is formed by two mounting halves 7, 8. Both mounting halves 7,8 have aligned through holes 9,10 through which mounting screws (not shown) protrude for fastening the mounting halves 7,8 to the front transverse profile 3 of the frame.

As can be seen in particular in FIGS. 2 and 3, each mount 6 has an inner ring 11 and an outer ring 12, which together form a gimbal suspension. As can be seen in particular in FIG. 3, the inner ring 11 can pivot about a horizontal axis and the outer ring 12 can pivot about a vertical axis. However, the orientation of the axes can vary because the inner ring 11 and outer ring 12 are rotatably mounted in the mount 6, as explained below.

The design of the mount 6 can be seen in particular in FIG. 4. The individual parts of the mount 6 are shown in FIG. 4 in a diagrammatic exploded view.

Half groove sections 17,18 are arranged in the mounting halves 7,8 of the mount 6, where the groove sections 17,18 together form an annular receiving groove. A mounting ring 13 is rotatably received in the annular receiving groove. The mounting ring 13 can be seen in FIG. 3. The mounting ring 13 is used for the rotatable arrangement of inner ring 11 and outer ring 12 in the mount 6. As explained below, an end boss 4 of a pressure vessel 1 is fixed in the inner ring 11. The mounting ring 13 is rotatable so that the end boss 4 can be received in the correct orientation in the mount 6. The mounting ring 13 can be rotated to the correct rotational position and clamped there with grub screws 14. Two threaded holes 15, 16 are arranged in the two mounting halves 7, 8 for screwing in the grub screws 14, which fix the mounting ring 13 in the correct rotational position of the end boss 4 on the mount 6 after the entire mounting system with pressure vessels 1 has been assembled. If one of the grub screws 14 is sufficient to create a sufficient clamping force, the second grub screw 14 can be omitted.

The mounting ring 13 consists of two mounting ring halves 19, 20 (FIG. 4), which are divided in a vertical plane. Semicircular recesses 21 are arranged on the end faces of the mounting ring halves 19, 20 in the region of the parting plane of the mounting ring 13. Two recesses 21 on each of two abutting end faces of the mounting ring halves 19, 20 together form a receiving hole for a radially outer head portion of a pivot 22, with which the outer ring 12 is connected to the mounting ring 13 so as to be rotatable about a vertical pivot axis. For this purpose, the outer ring 12 has two pivot holes 23, 24 into which the inwardly projecting neck portions of the pivots 22, which have a reduced diameter, can be inserted. Each pivot hole 23, 24 is arranged in a central region of an outer ring half 25, 26.

The outer ring 12 in turn consists of two outer ring halves 25, 26, which also have semicircular recesses 27 on their end faces. Again, two semicircular recesses on abutting end faces of the outer ring halves 25, 26 together form a receiving hole in which a head portion of a pivot 28 can be received in each case. Again, the head portion, i.e., the large-diameter portion of the pivot 28 that is outward in the radial direction of the outer ring 12, is inserted into the receiving holes. Since the outer ring 12 is divided in a horizontal plane, the two pivots 28 form a horizontal pivot axis for the inner ring 11.

The inner ring 11 also consists of two inner ring halves 29,30. The two inner ring halves 29 and 30 also each have a pivot hole 31 and 32, respectively, each of which receives a radially inner neck portion of a pivot 28. The inner ring 11 is again divided in a vertical plane. The inner ring 11 has an annular groove 33 open toward a center of the inner ring 11. In the lateral regions of the open annular groove 33, material projections 34 are provided which project from the bottom of the annular groove 33 so that the depth of the annular groove 33 is reduced at the sides.

Figure 5:
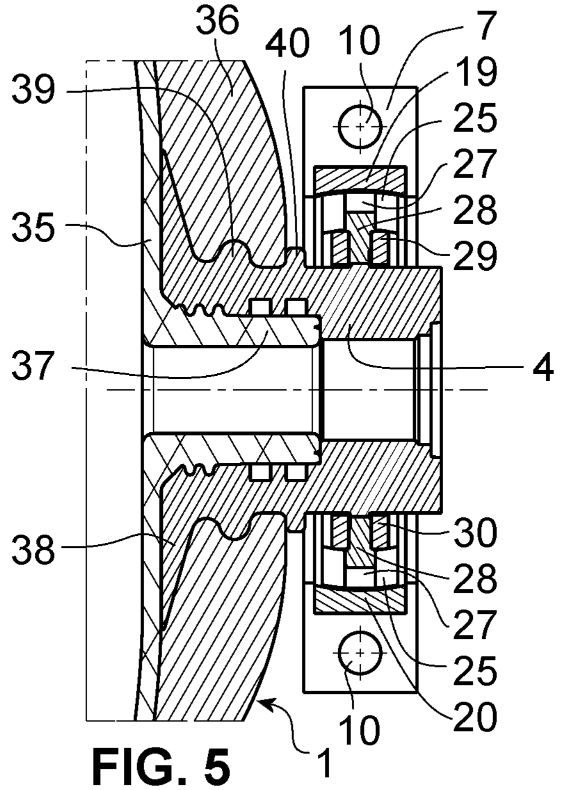
FIG. 5 shows a sectional view cut in a horizontal plane of the mount with the end boss of a pressure vessel inserted therein.
Figure 6:
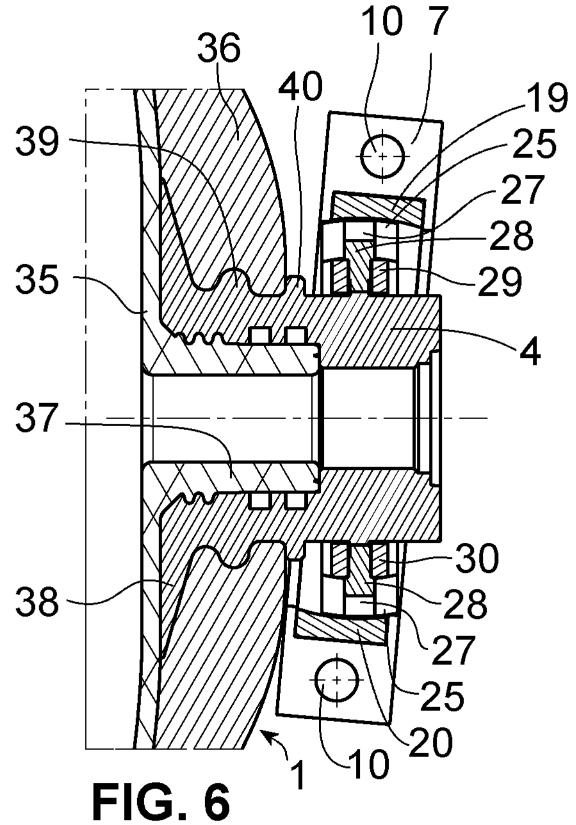
FIG. 6 shows a representation corresponding to FIG. 5 with the pressure vessel swiveled with respect to the mount.
Figure 8:
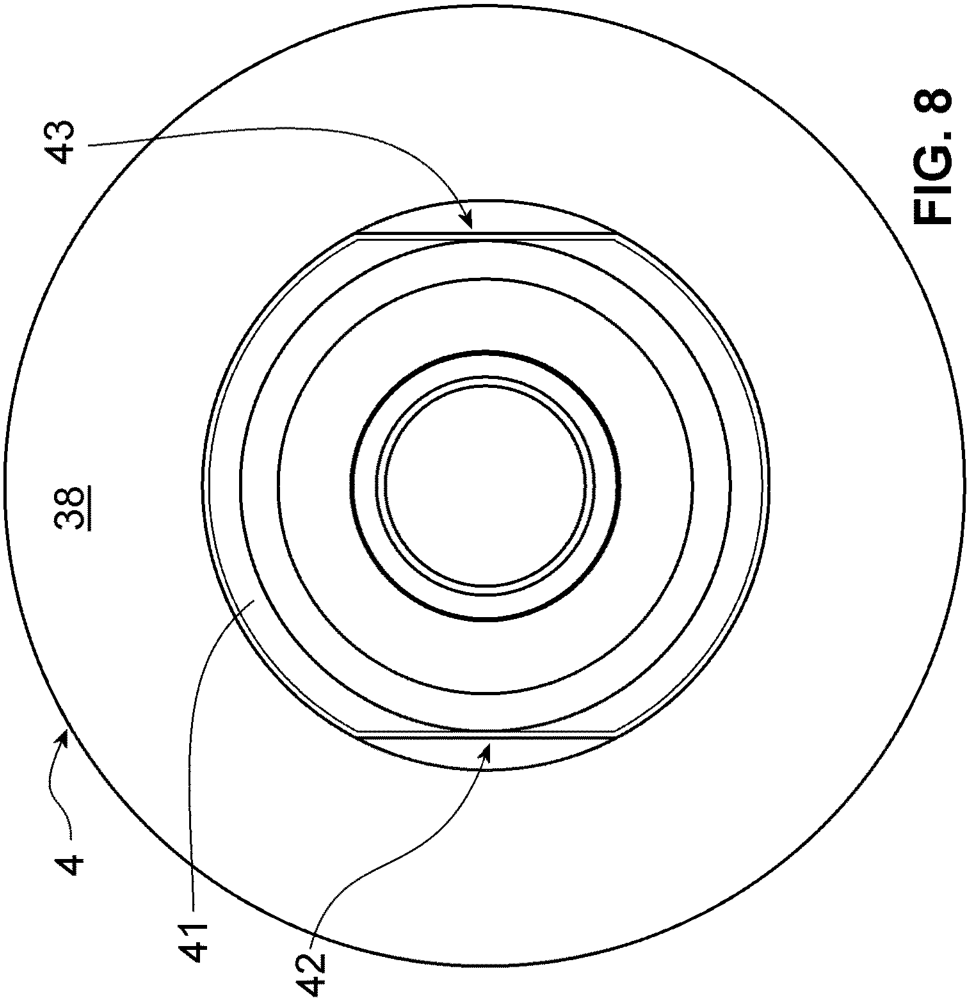
FIG. 8 shows a front view of the end boss of FIG. 7.
Figure 7:
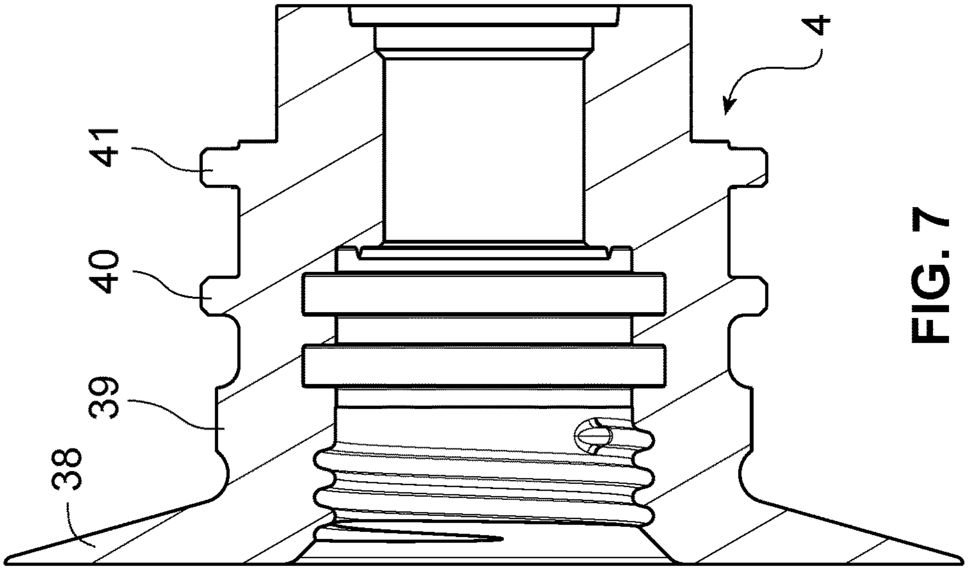
FIG. 7 shows an enlarged view, cut in a vertical plane, of the end boss of FIGS. 5 and 6.

To explain the interaction of the annular groove 33 in the inner ring 11 with the end boss 4, reference is first made to FIGS. 7 and 8, in which the isolated end boss 4 is shown in longitudinal section and front view, and to FIGS. 5 and 6, which show the end boss 4 and the adjacent region of the pressure vessel 1.

In FIGS. 5 and 6, it can be seen that the pressure vessel 1 has a liner 35 that tightly lines the pressure vessel. The liner 35 can be made of plastic but also of metal, for example aluminum. The liner 35 is surrounded on the outside by an outer layer 36, which is usually formed by a fiber composite material. The end boss 4 has a through hole for gas extraction from the interior of the pressure vessel 1 and for refueling. A neck portion 37 of the liner 35 is screwed into the end boss 4.

The neck piece is also referred to in practice as the end boss 4. The end boss 4 is usually made of metal and in the present case has a conical collar 38 which lies between the liner 35 and the outer layer 36 of the pressure vessel 1. The end boss 4 also has other radially outwardly projecting collars 39, 40 which ensure a firm connection with the outer layer 36. The final collar 41, which is closest to the front end of the end boss 4, is used for connection to the mount 6. The collar 41 can be seen in FIGS. 7 and 8. The collar 41 has flattenings 42, 43 on both sides which cooperate with the material projections 34 in the side regions of the groove 33. Of course, all other positively interlocking mounting elements can also be provided to connect the end boss 4 to inner ring 11 in a rotationally fixed manner. Screw or clamping elements can also be used to effect the rotational locking.

The front collar 41 of the end boss 4 is inserted into the annular groove 33 of the inner ring 11. Due to manufacturing tolerances, there may be deviations in the rotational position of the end boss 4 in relation to the rest of the pressure vessel 1. For this reason, the mounting ring 13 is rotatably held in the mount 6 and is only fixed to the mount 6 using the grub screws 14 after the end boss 4 of the pressure vessel 1 has been correctly mounted. Subsequently, the collar 41 is held non-rotatably in the mount 6 by the material projections 34 and the flattenings 42, 43. The mount 6 forms a fixed bearing which fixes the position of the end boss 4 in relation to the front transverse profile 3, whereby the end boss 4, as mentioned above, is gimbal mounted and can be pivoted in any direction about the two orthogonal axes formed by the pivots 22 and 28. Consequently, the slight movements of the mounts 6 during the deformation of the frame or of the pressure vessel 1 attached to the frame do not generate any forces acting on the structure of the pressure vessel 1.

Figure 9:
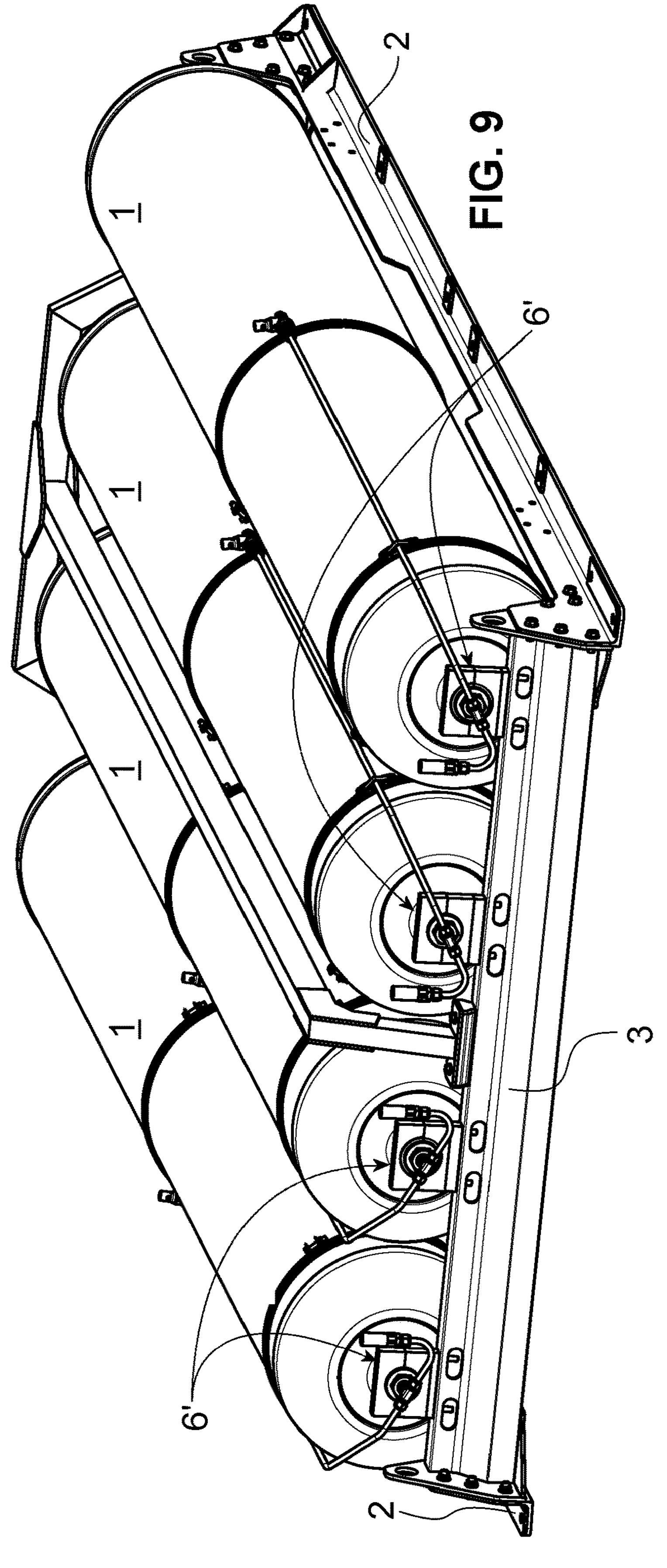
FIG. 9 shows a three-dimensional view of the rack with pressure vessels of FIG. 1 viewed from the rear.

The rear ends of the pressure vessel 1, which are not visible in FIG. 1, can be seen in FIG. 9. For cost reasons, the rear transverse profile 3 can be identical to the front transverse profile 3 (FIG. 1). The mounts 6' for the end bosses at the rear ends of the pressure vessels 1 can also be similar to the front mounts 6. The rear mounts 6' can form floating bearings for the end bosses, in which the end bosses of the pressure vessels 1 are received so as to be displaceable in the axial direction. The pressure vessels 1 elongate by up to 8 mm depending on the outside temperature and internal pressure. For this reason, the rear end of each pressure vessel 1 shown in FIG. 9 can be displaced with respect to the rear transverse profile 3. For this purpose, the rear mounts 6' can be provided with an axial degree of freedom. This can be achieved, for example, by the mounting ring 13 not being held in a groove but resting displaceably on a flat annular or cylindrical surface to provide a gimbal mounting for the rear end bosses of the pressure vessels 1, but with a longitudinal displaceability of the bearing point, so that longitudinal stresses acting on the pressure vessels 1 are avoided.

The features of the invention disclosed in the present description, in the drawings as well as in the claims may be essential, both individually and in any combination, for the realization of the invention in its various embodiments. The invention is not limited to the embodiments described. It may be varied within the scope of the claims and with due regard to the knowledge of the person skilled in the art.

The invention claimed is:

1. A mounting system for pressure vessels, comprising:

a first supporting member on which at least one first mount for a first end of the pressure vessel is arranged;

a second supporting member on which at least one second mount for a second end of the pressure vessel is arranged; and an inner ring disposed in the first mount to accommodate the first end of the pressure vessel in a rotationally fixed manner, wherein the inner ring prevents rotation of the pressure vessel and is fastened pivotably about a first pivot axis in an outer ring which in turn is fastened pivotably in the first mount about a second pivot axis extending at right angles to the first pivot axis;

wherein the outer ring is fastened in the first mount consisting of two mounting halves divided along a diametrically extending block plane, wherein the first mount bas an annular receiving groove into which a mounting ring is inserted which is divided into two mounting ring halves along a mounting ring plane extending at right angles to the block plane.

2. The Mounting system according to claim 1, wherein the inner ring includes at least one of the following features:

the inner ring consists of two inner ring halves divided along a first parting plane extending diametrically;

the inner ring is rotatably mounted to the outer ring via a pair of pivots;

the inner ring has an inwardly open annular groove, a collar at the first end of the pressure vessel being insertable into the annular groove;

the inner ring has at least one retaining element which interacts in a form-fitting manner with a complementary retaining element at the first end of the pressure vessel;

two diametrically opposed material projections are provided as the at least one retaining element and the complementary retaining element, which project radially inwards from the bottom of the groove and are each arranged on one of the inner ring halves;

the pair of pivots project into pivot holes which are arranged diametrically opposite one another in the region of the material projections.

3. The Mounting system according to claim 2, wherein the outer ring includes at least one of the following features:

the outer ring consists of two outer ring halves which are divided along a second parting plane extending diametrically;

two diametrically opposed receiving holes for receiving the pair of pivots are arranged in the region of the second parting plane;

each outer ring half has a pivot hole in a central region for receiving a pivot that is different from the pair of pivots.

4. The Mounting system according to claim 3, wherein the second parting plane extends perpendicularly to the first parting plane.

5. The Mounting system according to claim 2, wherein the second end of the pressure vessel is movably fastened to the second mount in a longitudinal direction of the pressure vessel.

6. The Mounting system according to claim 1, wherein the outer ring includes at least one of the following features:

the outer ring consists of two outer ring halves which are divided along a second parting plane extending diametrically;

two diametrically opposed receiving holes for receiving a pair of pivots of the inner ring are arranged in the region of the second parting plane;

each outer ring half has a pivot hole in a central region for receiving a pivot that is different from the pair of pivots.

7. The Mounting system according to claim 6, wherein the second end of the pressure vessel is movably fastened to the second mount in a longitudinal direction of the pressure vessel.

8. The Mounting system according to claim 1, wherein;

the inner ring consists of two inner ring halves divided along a first parting plane extending diametrically;

the outer ring consists of two outer ring halves divided along a second parting plane extending diametrically; and the second parting plane extends perpendicularly to athe first parting plane.

9. The Mounting system according to claim 8, wherein the mounting ring has, in a region of the mounting ring plane, two diametrically opposite receiving holes for receiving a pivot different from a pair of pivots in each case.

10. The Mounting system according to claim 9, wherein the mounting ring is held rotatably and lockably in the annular receiving groove.

11. The Mounting system according to claim 10, wherein at least one mounting half has a threaded hole which opens into the receiving groove and receives a grub screw that locks the mounting ring.

12. The Mounting system according to claim 8, wherein the second end of the pressure vessel is movably fastened to the second mount in a longitudinal direction of the pressure vessel.

13. The Mounting system according to claim 1, wherein the mounting ring has, in a region of the mounting ring plane, two diametrically opposite receiving holes for receiving a pivot different from a pair of pivots by which the inner ring is rotatably mounted to the outer ring.

14. The Mounting system according to claim 13, wherein the mounting ring is held rotatably and lockably in the annular receiving groove.

15. The Mounting system according to claim 14, wherein at least one mounting half has a threaded hole which opens into the receiving groove and receives a grub screw that locks the mounting ring.

16. The Mounting system according to claim 1, wherein the second end of the pressure vessel is movably fastened to the second mount in a longitudinal direction of the pressure vessel.

* * * * *